May 17, 1949.  T. J. PFETCHER  2,470,520
REFRIGERATED MILKER PAIL
Filed Aug. 8, 1946  2 Sheets-Sheet 1
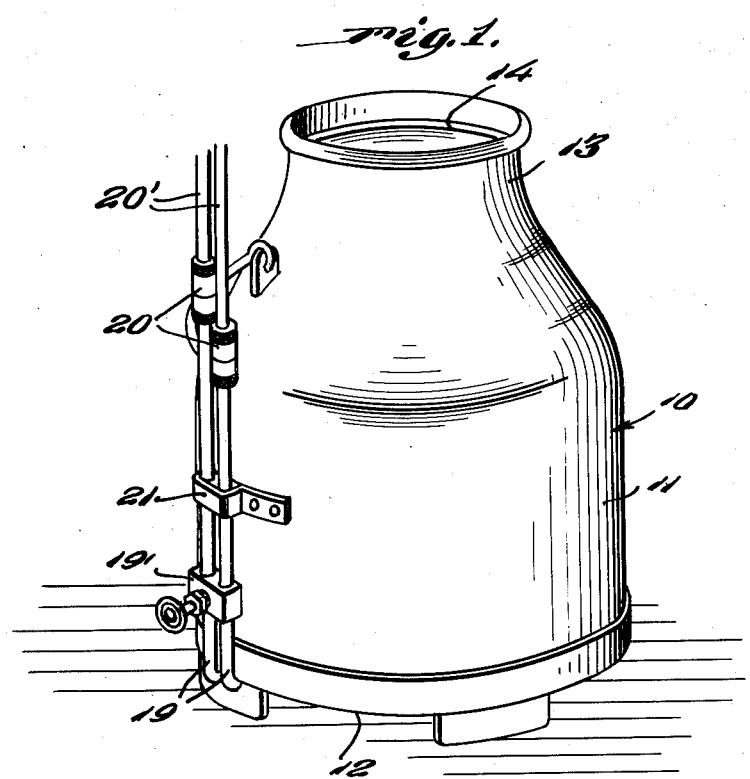
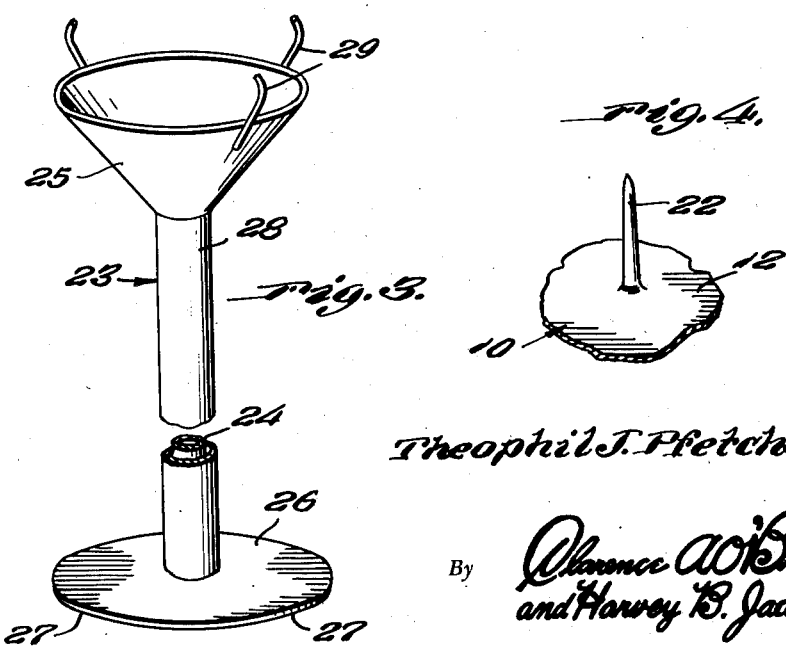
Inventor
Theophil J. Pfetcher
By Clarence A. O'Brien
and Harvey B. Jacobson
Attorneys May 17, 1949.　　　T. J. PFETCHER　　　2,470,520
REFRIGERATED MILKER PAIL
Filed Aug. 8, 1946　　　　　　　2 Sheets-Sheet 2
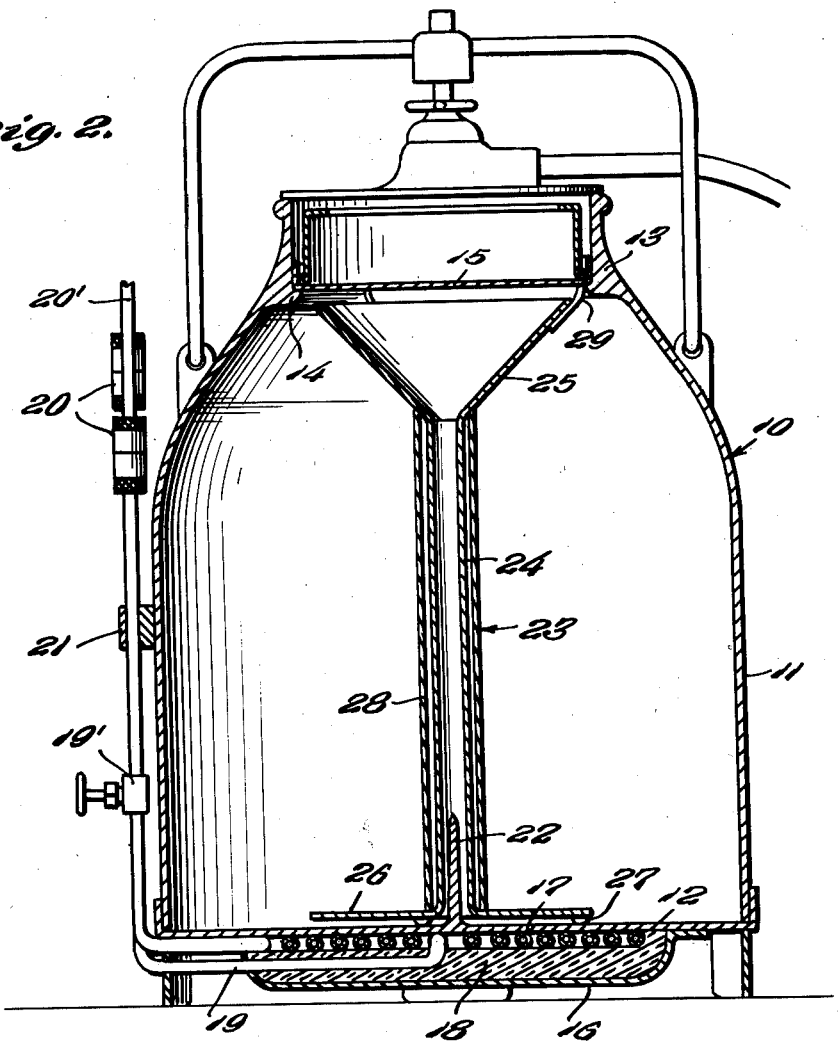
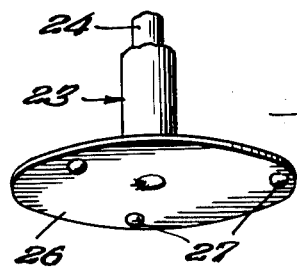
Inventor
Theophil J. Pfetcher
By Clarence A. O'Brien
and Harvey B. Jacobson
Attorneys Patented May 17, 1949

2,470,520

UNITED STATES PATENT OFFICE 2,470,520

REFRIGERATED MILKER PAIL

Theophil J. Pfetcher, Norwalk, Wis.

Application August 8, 1946, Serial No. 689,307

4 Claims. (Cl. 31—4)

This invention relates to a refrigerated milker pail and has for its primary object to extract the animal heat from freshly produced milk as it is taken from the milk producing animal.

Another object is to inhibit the growth of bacteria in fresh milk.

The above and other objects may be attained by employing this invention which embodies among its features a receptacle adapted to receive fresh warm milk from a supply source, such as a milking machine, means to refrigerate an area of the receptacle and means to direct fresh warm milk from the source in the form of a thin layer over the refrigerated area of the receptacle and subsequently to discharge the cool milk into the receptacle.

Other features include means to inhibit the transfer of heat from the inflowing milk to the milk contained in said receptacle.

In the drawings:

Figure 1 is a perspective view of a milker pail embodying the features of this invention, Figure 2 is an enlarged sectional view through the milker pail, Figure 3 is a perspective view of the milk directing tube and spreader, Figure 4 is a fragmentary perspective view of the bottom of the milk pail showing the centering pin for the milk directing tube, and Figure 5 is a fragmentary perspective view of the underside of the spreader.

Referring to the drawings in detail, the milker pail of my improved structure is designated generally 10 and comprises a cylindrical side wall 11 closed by a bottom 12 and provided at its upper end with a reduced neck 13 having an inwardly extending flange 14 forming a shoulder upon which a filter 15 is adapted to rest. The upper end of the neck 13 is adapted to be closed by a conventional cover employed in connection with a milking machine, so that the fresh warm milk is delivered from the milk producing animal directly onto the filter 15 from whence it flows downwardly into the milker pail 10.

Secured to the underside of the bottom 12 is a casing 16 forming an enclosure for the reception of refrigerating coils 17 which are spaced from the casing 16 by means of a suitable insulating material 18 such as ground cork, mineral wool or the like. The coil 17 is connected by the conventional piping 19 through a valve 19' to suitable couplings 20 which are connected to pipes 20' leading to a conventional refrigerating machine (not shown) and these pipes 19 are secured to the side of the pail 10 through the medium of a clamp 21.

Secured in any suitable manner to the bottom 12 and extending upwardly into the interior of the pail 10 in axial alignment with the opening in the neck 13 is a centering pin 22 which cooperates with the milk directing tube and spreader designated generally 23.

The milk directing tube 23 comprises a tubular member 24 provided at its upper end with an inverted frusto-conical member 25, the upper end of which is of a diameter to enter the neck 13 and underlie the discharge end of the filter 15 so that milk deposited in the filter and flowing therethrough will be directed into the tube 24 in the manner of a funnel. The tube 24 is provided at its lower end with an outstanding flange 26 which is of a diameter substantially equal to the diameter of the coil 17 and is provided at spaced intervals with feet 27 to hold the flange in spaced relation to the bottom 12 and form a spreader which directs milk flowing downwardly through the tube 24 in the form of a thin layer over the refrigerated area of the bottom 12. In order to inhibit the transfer of heat from the milk flowing downwardly through the tube 24 toward the spreader, I surround the tube 24 with a concentric spaced tube 28, which may be sealed at opposite ends to the conical portion 25 and the flange 26 respectively, and the space between the tubes evacuated in order further to insulate the contents of the tube 24 from the contents of the pail or receptacle 10. In order to center the upper end of the tube 24 with relation to the neck 13, I provide at spaced intervals around the base of the conical member 25, yielding spring fingers 29 which are adapted frictionally to engage the innermost edge of the shoulder 14 as suggested in Figure 2.

In operation, the parts are assembled as shown in Figure 2, with the cover connected to a milking machine as suggested in the dotted lines of Figure 2. Upon setting the milking machine into operation, milk will be delivered into the filter 15 from which it will be discharged into the conical funnel 25 and thence will flow downwardly through the tube 24 and encountering the pin 22, it will be separated into a tubular mass which flows outwardly under the spreader flange 26 in a thin layer from which the heat may be extracted by the refrigerating coils 17. The cooled milk is then discharged around the periphery of the flange 26 into the receptacle or pail 10, gradually filling the said pail with chilled milk.

Obviously, due to the insulating tube 28, the milk contained within the pail 10 will remain chilled and will not absorb heat from the fresh milk flowing down the tube 24, so that the chilled and refrigerated condition of the milk contained within the pail or receptacle 10 will be preserved.

While in the foregoing there has been shown and described the preferred embodiment of this invention it is to be understood that minor changes in the details of construction, combination and arrangement of the parts may be resorted to without departing from the spirit and scope of the invention as claimed.

What I claim is:

1. A refrigerated milker pail which includes a receptacle adapted to receive fresh warm milk from a supply source, means on the receptacle to refrigerate an area thereof, a tube extending into the receptacle into which fresh warm milk is delivered from the source, a spreader carried by the tube adjacent the discharge end thereof, said spreader being of an area substantially equal to the refrigerated area and feet on the spreader resting on the refrigerated area to space the spreader a small distance from the refrigerated area to create a restricted passage in which the inflowing milk is spread into a thin layer over the refrigerated area and becomes chilled before it enters the receptacle around the tube.

2. A refrigerated milker pail which includes a receptacle adapted to receive fresh warm milk from a supply source, means on the receptacle to refrigerate an area thereof, a tube extending into the receptacle into which fresh warm milk is delivered from the source, a spreader carried by the tube adjacent the discharge end thereof, said spreader being of an area substantially equal to the refrigerated area and feet on the spreader resting on the refrigerated area to space the spreader a small distance from the refrigerated area to create a restricted passage in which the inflowing milk is spread into a thin layer over the refrigerated area and becomes chilled before it enters the receptacle around the tube, and means surrounding the tube to inhibit the transfer of heat from the inflowing milk to that contained within the receptacle.

3. A refrigerated milker pail which includes a receptacle adapted to receive fresh warm milk from a supply source, means on the receptacle to refrigerate an area of the bottom thereof, a tube extending into the receptacle into which fresh warm milk is delivered from the source and a spreader carried by the tube adjacent the discharge end thereof, said spreader being of an area substantially equal to the refrigerated area of the receptacle and feet on the spreader resting on the refrigerated area to space said spreader from said area and form a restricted passage in which milk flowing from the tube is spread into a thin layer over the refrigerated area to become chilled before it enters the receptacle around the tube.

4. A refrigerated milker pail which includes a receptacle adapted to receive fresh warm milk from a supply source, means on the receptacle to refrigerate an area of the bottom thereof, a tube extending into the receptacle, the inner end of the tube aligning with the center of the refrigerated area, a spreader on the tube adjacent the inner end thereof, said spreader being of an area substantially equal to the refrigerated area of the receptacle and feet on the spreader engaging the refrigerated area to space the spreader a small distance from the refrigerated area to form a restricted passage in which milk leaving the tube is spread into a thin layer over the refrigerated area and becomes chilled before it enters the receptacle around the tube, and means surrounding the tube to inhibit the transfer of heat from the milk flowing through the tube to that contained within the receptacle.

THEOPHIL J. PFETCHER.

REFERENCES CITED

The following references are of record in the file of this patent:

UNITED STATES PATENTS

| Number | Name | Date |
|---|---|---|
| 1,740,646 | Davis | Dec. 24, 1929 |